US009860066B2

United States Patent
Berger et al.

(10) Patent No.: US 9,860,066 B2
(45) Date of Patent: Jan. 2, 2018

(54) LOCATION CONTROL OF CLOUD DATA STORES

(71) Applicant: International Business Machines Corporation, Armonk, NY (US)

(72) Inventors: Shawn L. Berger, Austin, TX (US); Navneet Gupta, Austin, TX (US); Rick A. Hamilton, II, Charlottesville, VA (US); Shawn P. Mullen, Buda, TX (US); Nithya A. Renganathan, Austin, TX (US); Karen M. Siles, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 14/939,114

(22) Filed: Nov. 12, 2015

(65) Prior Publication Data

US 2017/0141921 A1    May 18, 2017

(51) Int. Cl.
H04L 29/06    (2006.01)
H04L 9/32     (2006.01)
H04L 9/06     (2006.01)
G06F 21/64    (2013.01)

(52) U.S. Cl.
CPC ............ *H04L 9/3239* (2013.01); *G06F 21/64* (2013.01); *H04L 9/0643* (2013.01); *H04L 63/126* (2013.01)

(58) Field of Classification Search
CPC ... H04L 9/3239; H04L 9/0643; H04L 63/126; G06F 21/64
See application file for complete search history.

(56) References Cited

U.S. PATENT DOCUMENTS

| 8,656,454 | B2 |   | 2/2014 | Gunawardena et al. |
| 9,148,475 | B1 | * | 9/2015 | Mealey ............ G06F 17/30277 |
| 9,621,347 | B2 | * | 4/2017 | Leighton .................. H04L 9/30 |
| 2006/0069655 | A1 | * | 3/2006 | Athens ............... G06Q 20/3674 705/67 |

(Continued)

OTHER PUBLICATIONS

Vaish et al., "Data Location Verification in Cloud Computing", International Journal of Computer Applications (0975-8887), vol. 68—No. 12, Apr. 2013, pp. 23-27.

(Continued)

*Primary Examiner* — Mohammad A Siddiqi
(74) *Attorney, Agent, or Firm* — William H. Hartwell; Maxine L. Barasch; Keohane & D'Alessandro PLLC

(57) ABSTRACT

Embodiments of the present invention utilize a data hash and an associated geotag for authentication of geolocation policies for data object storage in a cloud system. The geotag may be an alphanumeric identifier such as a city name, postal (ZIP) code, and/or latitude-longitude pair. Embodiments include a post-authenticate process, in which, after a data object is retrieved from a BMS, the geographic location of the source is confirmed to ensure the location policies have not been violated. Additionally, embodiments include a pre-authenticate process, in which, prior to storing a data object in a BMS, the geographic location of the BMS that is to receive the data object is confirmed to ensure the location policies will not be violated. Embodiments may use pre-authenticate, post-authenticate, or both pre-authenticate and post-authenticate, in order to implement and verify the location policies.

18 Claims, 9 Drawing Sheets

(56) References Cited

U.S. PATENT DOCUMENTS

2013/0238789 A1    9/2013  Bade et al.
2016/0021687 A1*   1/2016  Granbery ............ H04W 76/021
                                                            455/41.2
2016/0321290 A1*  11/2016  Luthra .............. G06F 17/30233

OTHER PUBLICATIONS

Scarfone, "The new NIST cloud security proof-of-concept implementation details how to manage workloads based on cloud geolocation data", NIST cloud security spec addresses cloud geolocation, data security, Jan. 2013, 4 pages.

Gondree et al., "Geolocation of Data in the Cloud", CODASPY'13, Feb. 18-20, 2013, San Antonio, Texas, USA. Copyright 2013 ACM, 12 pgs.

Biswal et al., "Classification Based IP Geolocation Approach to Locate Data in the Cloud Datacenters", 2014 ASE BIGDATA/SOCIALCOM/CYBERSECURITY Conference, Stanford University, May 27-31, 2014, 9 pgs.

Banks et al., "Trusted Geolocation in the Cloud: Proof of Concept Implementation (Draft)", NIST Interagency Report, 7904, Dec. 2012, 42 pages.

Raghu Yeluri, intel Look Inside, "Accelerate OpenStack Together", Openstack Summit, Paris, Security Session, Nov. 2014, 28 pages.

* cited by examiner

LOCATION CONTROL OF CLOUD DATA STORES

FIELD OF THE INVENTION

The present invention relates generally to data storage and, more particularly, to a method and system for location control of cloud data stores.

BACKGROUND

With the advent of the Internet and broadband computer networks, the options for data storage have changed. These systems enable data to be stored on a network and accessible anywhere. No longer are users limited to data stored on their local machine.

Cloud computing is a type of computing in which computing resources such as application programs and data object storage are remotely provided over the Internet. In a cloud computing system, a client program such as a web browser interfaces with and controls an application program that is running on a remote server. Through the browser, the user can create, edit, save, and delete files on the remote server via the remote application program. In particular, cloud storage allows data to be redundantly stored and shared by multiple clients. Cloud storage provides an abstraction for physical storage devices. In general, cloud storage allows users to store and access data files somewhere in "the cloud," without knowing the details of where files are stored or having to manage physical storage devices. In cloud storage, capacity can be available on demand and files can be made available on a global basis. As the data storage requirements faced by many businesses continue to increase, cloud storage will continue to be an important aspect of computer application implementation.

SUMMARY

Embodiments of the present invention utilize a data hash and an associated geotag for authentication of geolocation policies for data object storage in a cloud system. The geotag may be an alphanumeric identifier such as a city name, postal (ZIP) code, and/or latitude-longitude pair. Embodiments include a post-authenticate process, in which, after a data object is retrieved from a BMS, the geographic location of the source is confirmed to ensure the location policies have not been violated. Additionally, embodiments include a pre-authenticate process, in which, prior to storing a data object in a BMS, the geographic location of the BMS that is to receive the data object is confirmed to ensure the location policies will not be violated. Embodiments may use pre-authenticate, post-authenticate, or both pre-authenticate and post-authenticate, in order to implement and verify the location policies.

In a first aspect, embodiments of the present invention provide a computer-implemented method for confirming a physical storage location of data comprising: retrieving a data object from a bare metal storage node; retrieving encrypted metadata for the data object, wherein the encrypted metadata comprises a stored hash for the data object; and a geotag; decrypting the encrypted metadata; computing a new hash for the data object; comparing the new hash to the stored hash and signaling a first error in response to the stored hash being unequal to the new hash; and checking the geotag against a location policy and signaling a second error if the location policy is violated.

In a second aspect, embodiments of the present invention provide a computer-implemented method for confirming a physical storage location of data comprising: writing a data object to a bare metal storage node, wherein the bare metal storage node comprises a processor, memory coupled to the processor, and a security chip coupled to the processor; computing a hash of the data object using the processor; sending the hash to the security chip; encrypting the hash and a geotag using the security chip to form an encrypted metadata block; reading the data object and encrypted metadata block from the bare metal storage node; decrypting the encrypted metadata block to decrypt the hash and the geotag; computing a new hash for the data object; comparing the new hash to the decrypted hash and signaling a first error if the new hash is unequal to the decrypted hash; and checking the geotag against a location policy and signaling a second error if the location policy is violated.

In a third aspect, embodiments of the present invention provide a cloud storage system comprising: a container node computer comprising a processor and memory; a bare metal storage node (BMS) device, wherein the BMS device comprises a processor; at least one storage device; a memory coupled to the processor; a security chip; a bus coupling the security chip to the processor; wherein the container node memory contains instructions, that when executed by the processor of the container node computer, perform the steps of: retrieving a data object from the BMS device; retrieving encrypted metadata for the data object, wherein the encrypted metadata comprises a stored hash for the data object and a geotag; decrypting the encrypted metadata; computing a new hash for the data object; comparing the new hash to the stored hash and signaling a first error if the stored hash is unequal to the new hash; and checking the geotag against a location policy and signaling a second error if the location policy is violated.

BRIEF DESCRIPTION OF THE DRAWINGS

Features of this invention will be more readily understood from the following detailed description of the various aspects of the invention taken in conjunction with the accompanying drawings.

DETAILED DESCRIPTION

Figure 1:
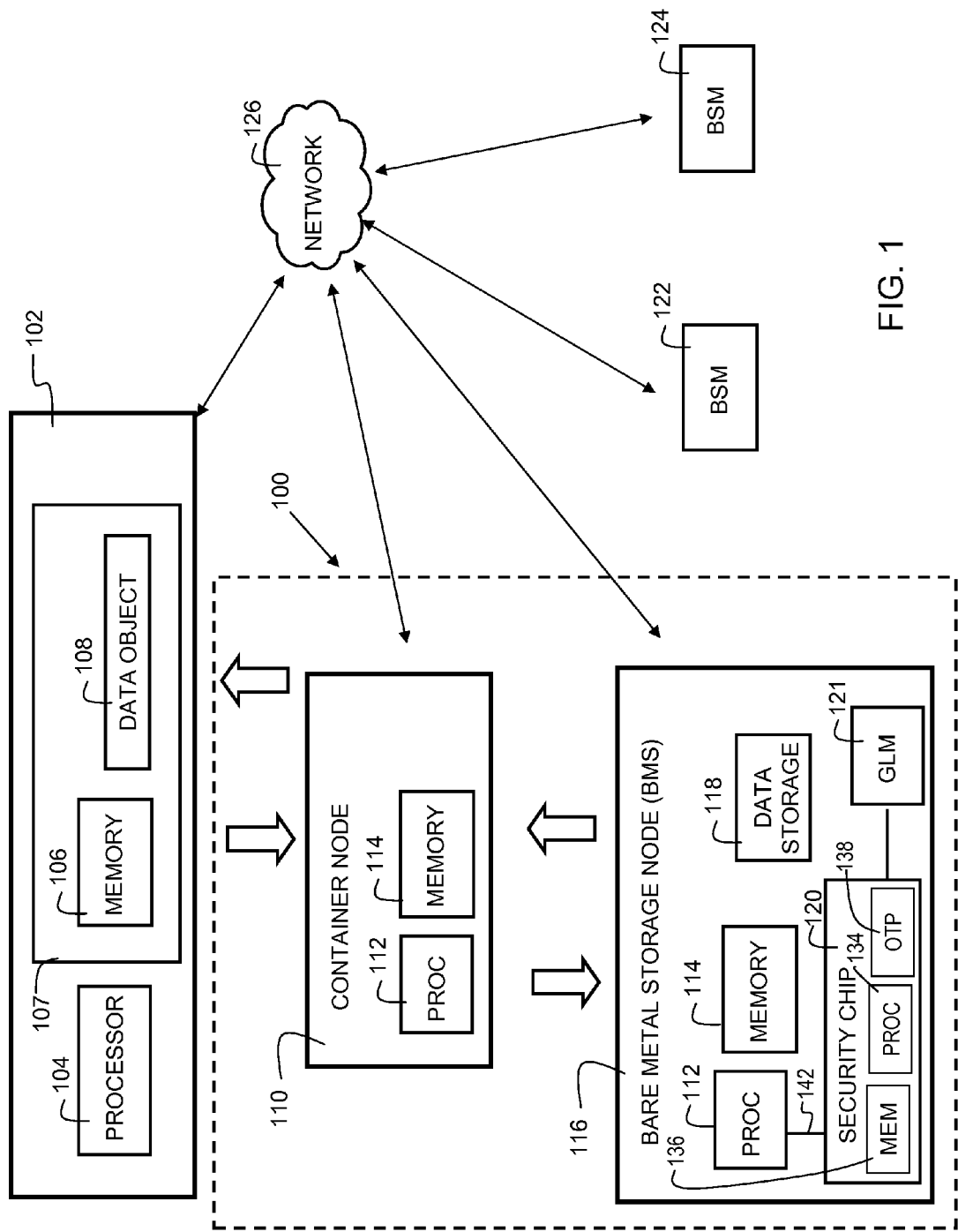
FIG. 1 is a block diagram of a cloud storage system in accordance with embodiments of the present invention.

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide methods and systems for controlling and authenticating the geographic location of a particular data object within a distributed cloud-based system. The actual data is stored on a device referred to as a bare metal storage device (BMS). The BMS is essentially a computer which includes a storage element and a security chip. A cloud storage system may include many BMS devices that are geographically spread out over large distances. This provides data redundancy and safety due to events such as natural disasters. For example, by locating BMS nodes in data centers in both California and Virginia, data can be accessed from Virginia in the event of a large scale power outage in California due to an earthquake. Similarly, data can be accessed from California in the event of a large scale power outage in Virginia due to a hurricane. In general, when both systems are operating normally, data may be written and retrieved from either one of, or both of the data centers. Elements such as high-availability proxies, load balancers, and other equipment can be used to manage such access.

While the geographic redundancy is beneficial for data safeguarding and access, there are certain situations where a particular data object needs to be stored in a particular geographic region. Typically these reasons are legal in nature, based on regulatory or legal requirements of a particular jurisdiction. For example, citizen data is often required to be stored within the country to which the citizens belong. Similarly, sensitive data such as military defense data may often have similar storage requirements. It is therefore desirable to have systems and methods for administering such data storage policies and additionally for authenticating that those policies are being correctly enforced.

Embodiments of the present invention utilize a data hash and an associated geotag for authentication of geolocation policies for data object storage in a cloud system. The geotag may be an alphanumeric identifier such as a city name, postal (ZIP) code, and/or a latitude-longitude pair. Embodiments include a post-authenticate process, in which, after a data object is retrieved from a BMS, the geographic location of the source is confirmed to ensure the location policies have not been violated. Additionally, embodiments include a pre-authenticate process, in which, prior to storing a data object in a BMS, the geographic location of the BMS that is to receive the data object is confirmed to ensure the location policies will not be violated. Embodiments may use pre-authenticate, post-authenticate, or both pre-authenticate and post-authenticate, in order to implement and verify the location policies.

FIG. 1 is a block diagram of a cloud storage system 100 in accordance with embodiments of the present invention. Cloud storage system 100 includes a container node 110, along with a plurality of bare metal storage nodes, indicated as 116, 122, and 124. For the purposes of clarity, internal details of BMS 116 are shown, whereas the BMS 122 and BMS 124 are represented as simple boxes. However, the functionality of BMS 116, 122, and 124 are substantially similar to one another. The container node 110 comprises processor 112 and memory 114. Memory 114 is coupled to processor 112 and contains instructions, that when executed by processor 112, perform processes and functions for implementation of geolocation policies. In particular, the container node interfaces with a client device 102. The client device 102 comprises a processor 104 and a memory 106 coupled to the processor. Client device 102 further comprises storage 107 such as a data memory, flash device, magnetic device, and/or optical device or other suitable storage device for storing data object 108. Data object 108 may, for example, be a file such as a document or photograph, or a collection of related files and data such as a multi-file archive. The client device 102, container node 110, and BMS devices 116, 122, and 124 are interconnected via a network, indicated generally as reference 126. In some embodiments, network 126 may include the Internet. In some embodiments, not all devices are visible to each other. For example, the BMS devices 116, 122, and 124 may share a private network or subnet with the container node 110, such that the client device 102 cannot directly access the BMS devices. The container node 110 may have access to both the BMS devices and the client device 102. Furthermore, while only one container node 110 is shown in system 100, in practice, there may be multiple container nodes like container node 110 and multiple BMS devices such as 116, 122, and 124 that comprise the cloud storage system 100. Using multiple container nodes facilitates scalability and supports multiple users, high availability, and redundancy.

Referring now to details of BMS 116, it can be seen that each BMS includes a processor 112, and memory 114 which contains instructions that are executed by processor 112. BMS further includes data storage 118. Data storage 118 may include an array of magnetic hard disks. In some embodiments, the array of magnetic hard disks may be in a RAID configuration. In other embodiments, data storage 118 may include a storage medium other than magnetic hard disks, such as solid state hard disks, flash memory, optical memory, or other suitable technology.

The security chip 120 has its own processor 134 and its own memory 136. Furthermore, security chip 120 may also include one-time programmable memory 138. The one-time programmable (OTP) memory 138 may include a geotag, as well as an encryption key. In embodiments, an asymmetric encryption scheme is used, with a private key stored in the OTP memory 138 or secure chip memory 136. In an embodiment using the OTP memory 138 to store the geotag, the geotag contents cannot be changed once programmed. In some embodiments, a geolocation module (GLM) 121 is also included in the BMS 116. The geolocation module 121 may include a Global Positioning System (GPS), or other satellite-based positioning system. In such embodiments, if the BMS is transported to another location, the geotag information may be updated and stored in security chip memory 136. The security chip 120 is coupled to the BMS processor 112 via bus 142 to facilitate communication between the security chip 120 and BMS processor 112. In embodiments, bus 142 may be an I2C or SPI bus. In embodiments, the security chip memory 136 and/or OTP memory 138 are only readable by the security chip processor 134. Information such as a geotag may be shared with the BMS processor 112 by encrypting the geotag within the security chip using a private key, then sending the encrypted geotag via bus 142 to processor 112, which in turn sends the encrypted data to the container node 110. The container node 110 may decrypt the geotag using a public key. Hence the encryption used may be an asymmetric encryption scheme where the container node stores a public key for each BMS device that it is connected to, and each BMS device has a corresponding private key stored within its security chip. In embodiments, the security chip may be a TPM (Trusted Platform Module) which is part of a TXT (Trusted eXecution Technology) system.

Figure 2:
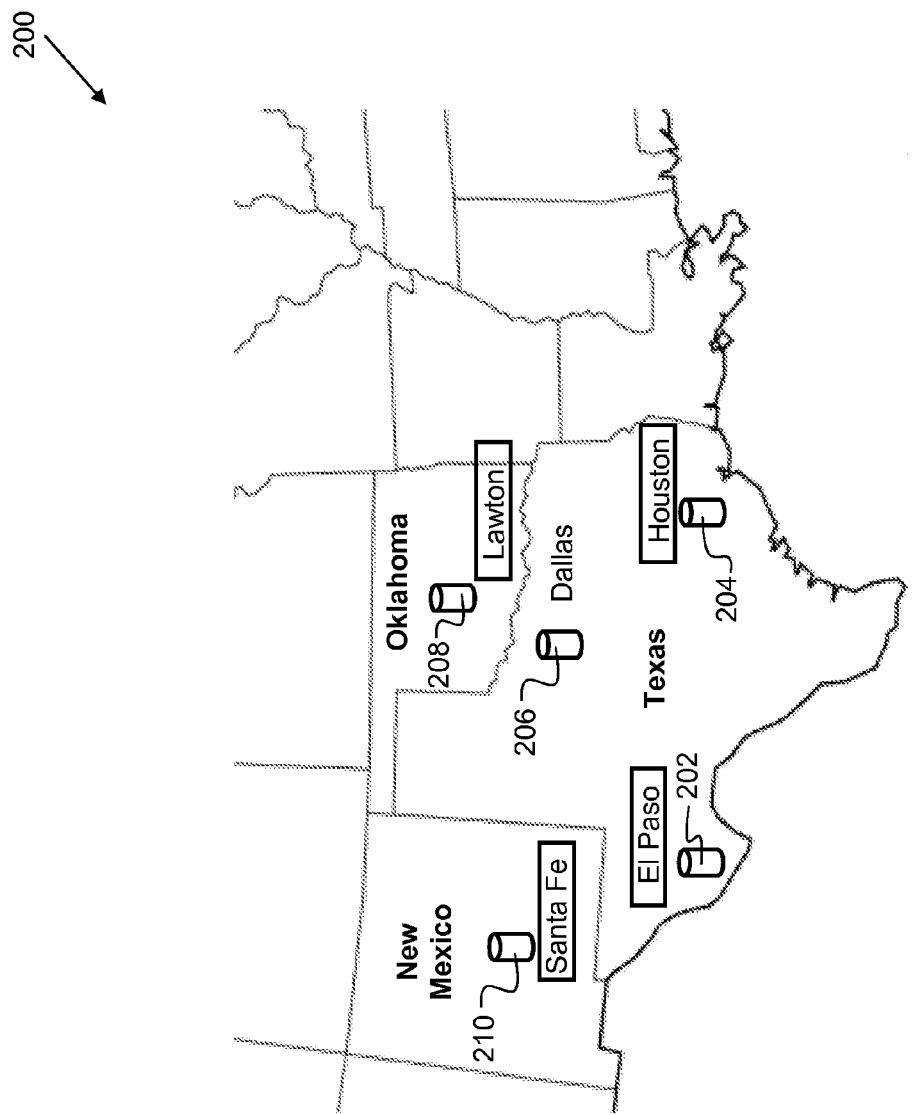
FIG. 2 is a geographic view of an exemplary cloud storage system in accordance with embodiments of the present invention.

FIG. 2 is a geographic view 200 of an exemplary cloud storage system in accordance with embodiments of the present invention. In the example depicted in FIG. 2, there are five BMS devices, indicated as 202, 204, 206, 208, and 210. BMS devices 202, 204, and 206 are located in Texas, BMS device 208 is located in Oklahoma, and BMS device 210 is located in New Mexico. Each BMS device has a corresponding alphanumeric geotag, indicating its location. BMS device 202 has a geotag of "El Paso." BMS device 204 has a geotag of "Houston." BMS device 206 has a geotag of "Dallas." BMS device 208 has a geotag of "Lawton." BMS device 210 has a geotag of "Santa Fe." Continuing with this example, for a certain data object, there is a location policy that requires that the data be stored in the state of Texas. Thus, for that data object, eligible BMS devices include device 202, device 204, and device 206. Ineligible devices include BMS device 208 and BMS device 210, both of which are outside of Texas. Therefore, in embodiments, the location policy may be defined by a list of eligible servers. That is, in embodiments, checking the geotag comprises checking an alphanumeric identifier against a list of approved alphanumeric identifiers. Referring again to the example of geographic view 200, for a location policy that requires data storage within Texas, the list of eligible servers includes El Paso, Houston, and Dallas.

Figure 3:
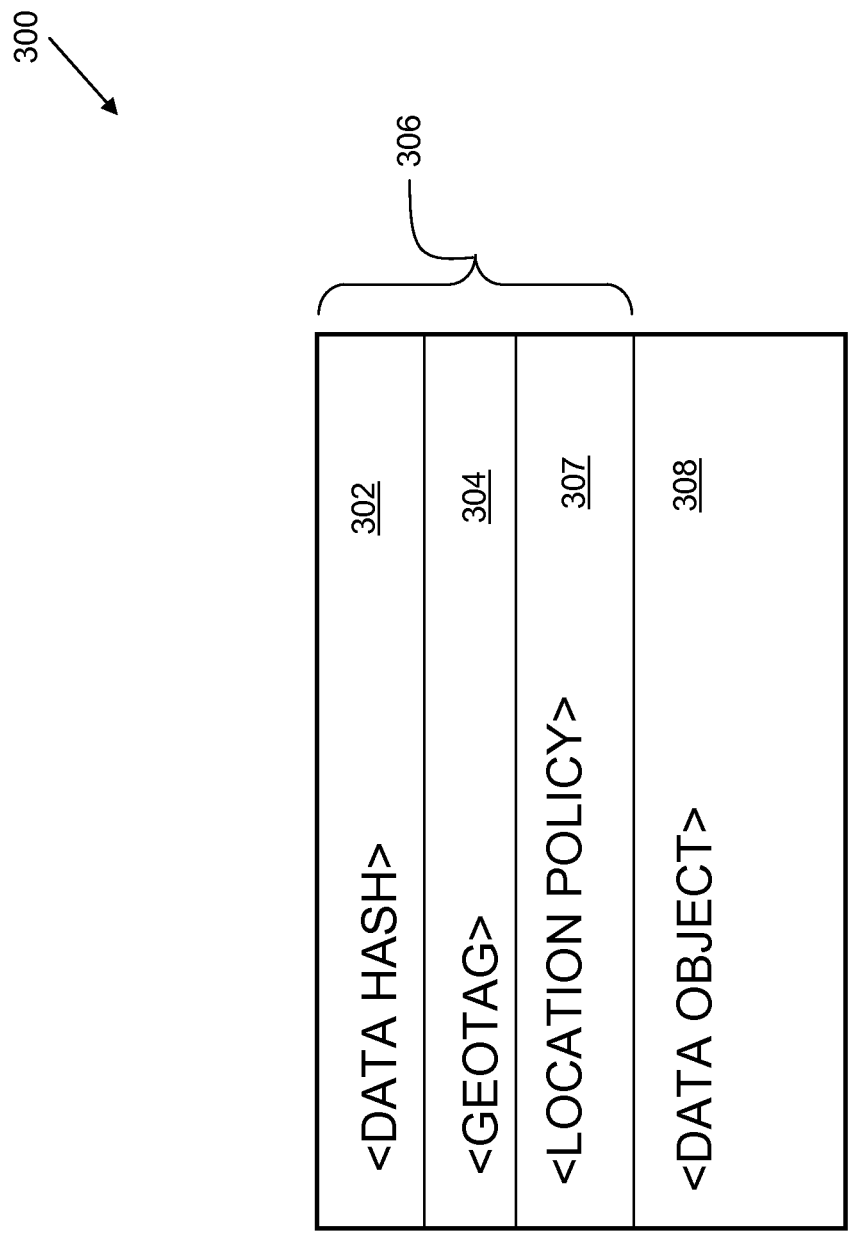
FIG. 3 is an exemplary data structure in accordance with embodiments of the present invention.

FIG. 3 is an exemplary data structure 300 in accordance with embodiments of the present invention. Data structure 300 includes a metadata block 306 and a data object 308. The data object 308 typically represents a file that is stored on the cloud storage system. The metadata block 306 includes a data hash 302, a geotag 304, and may optionally include a location policy 307. The data hash 302 is a hash of the data object 308. This data hash cryptographically binds the data object 308 and the geotag 304. Hence, it can now be verified that the particular data object 308 is stored at the location represented by geotag 304. The location policy 307 may include a list of allowable geotags, or an "ANY" indicator, meaning that any BMS may be used for a particular data object. In such a system, it is possible to store a mixture of geographically sensitive data (data that must be stored within a given jurisdiction) and non-geographically sensitive data (data that can be stored in any available BMS device). The location policy may be set on a data object basis to accommodate different geographic storage requirements.

Figure 4:
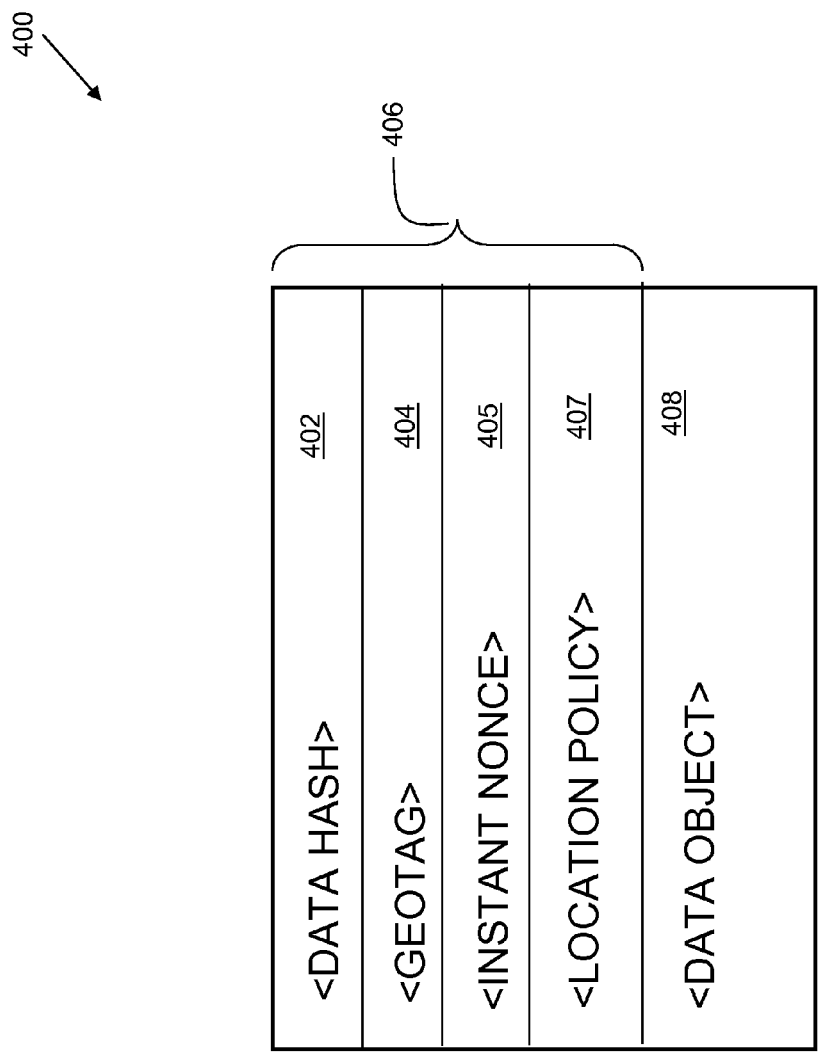
FIG. 4 is an exemplary data structure in accordance with alternative embodiments of the present invention.

FIG. 4 is an exemplary data structure 400 in accordance with alternative embodiments of the present invention. Data structure 400 is similar to data structure 300 in that it contains metadata block 406 and data object 408. Similar to data structure 300, data structure 400 includes a data hash 402, a geotag 404, and a location policy 407. The difference between data structure 400 and data structure 300 is the addition of an instant nonce 405 in metadata block 406. The instant nonce 405 is a random number that is generated immediately prior (e.g., within two seconds) of a data access. The instant nonce is sent to the BMS device that is to store data or supply retrieved data. The security chip in the BMS encrypts the instant nonce and it is included in metadata block 406. This serves to make a man-in-the-middle attack more difficult, since it requires the ability to encrypt some fresh data with the security chip key. Together, the data hash, geotag, instant nonce, and location policy cryptographically bind the data object to the geotag while also preventing a man-in-the-middle attack.

Figure 5:
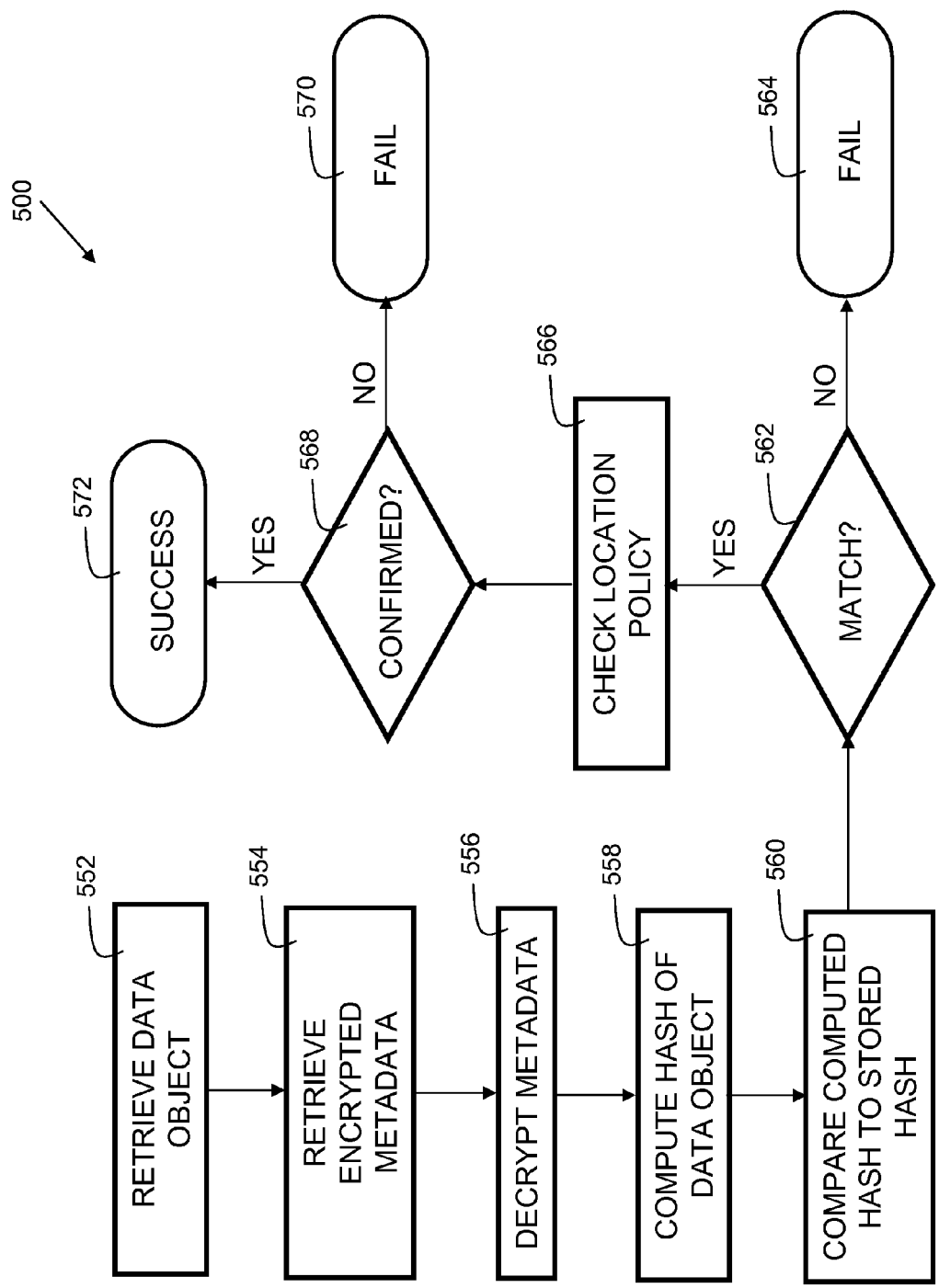
FIG. 5 is a flowchart indicating process steps for a post-authentication process in accordance with embodiments of the present invention.

FIG. 5 is a flowchart 500 indicating process steps for a post-authentication process in accordance with embodiments of the present invention. The process starts with a container node retrieving the data object 552. This may be performed by a container node reading a data object from a BMS device. In process step 554, a container node retrieves encrypted metadata associated with the data object. This may be performed by a container node reading the encrypted metadata from a BMS device. In some embodiments, process step 552 and process step 554 may be performed simultaneously. For example, the metadata may be appended or prepended to the data object such as is illustrated in FIG. 3 and FIG. 4. In such an embodiment, the data object and associated metadata may be retrieved simultaneously. In process step 556, the container node decrypts the metadata. In embodiments, the decryption uses a public key that corresponds to a private key within the security chip of the BMS device that the data object is being retrieved from. The decrypted metadata includes a stored hash of the data object, a geotag, and may optionally include a location policy for that object, similar to as shown in FIG. 3. In process step 558, the container node computes a hash of the data object. This computation may be performed on the container node device. In embodiments, the hash may be an md5 (message digest 5) hash, or SHA (secure hash algorithm) hash such as SHA-1 or SHA-2. Other hash algorithms or checksums (e.g., CRC-32) may also be used. In process step 560, the hash computed by the container node is compared to the decrypted stored hash that came from the BMS device. If the computed hash and stored hash match at step 562, then the data object is confirmed to have been retrieved from a location-compliant BMS device. That is, the data object originated from the BMS device indicated by the geotag that was part of the metadata retrieved in process step 554, and the process proceeds to process step 566 of checking the location policy. If the computed hash and stored hash do not match, then the process ends at step 564 in a failure state. An error indication may be propagated to users and administrators of the cloud storage system. The error indication may include identification of the BMS device and container node involved in the failed transaction. In process step 566, a location policy is checked. In some embodiments, the location policy may include a list of eligible geotags. For example, referring to the example of FIG. 2, in the case where data objects are to be stored in Texas only, the location policy may be of the format: "Dallas, El Paso, Houston." If the geotag decrypted in the metadata of step 556 is one of those geotags, then the location policy is confirmed in process 568, resulting in successful completion at step 572. If the geotag from the metadata does not match one of the strings in the location policy, then the process enters a failure state at step 570. An error indication may be propagated to users and administrators of the cloud storage system. The error indication may include identification of the BMS device and container node involved in the failed transaction. This allows the geolocation policy violation to be identified and corrected.

Figure 6:
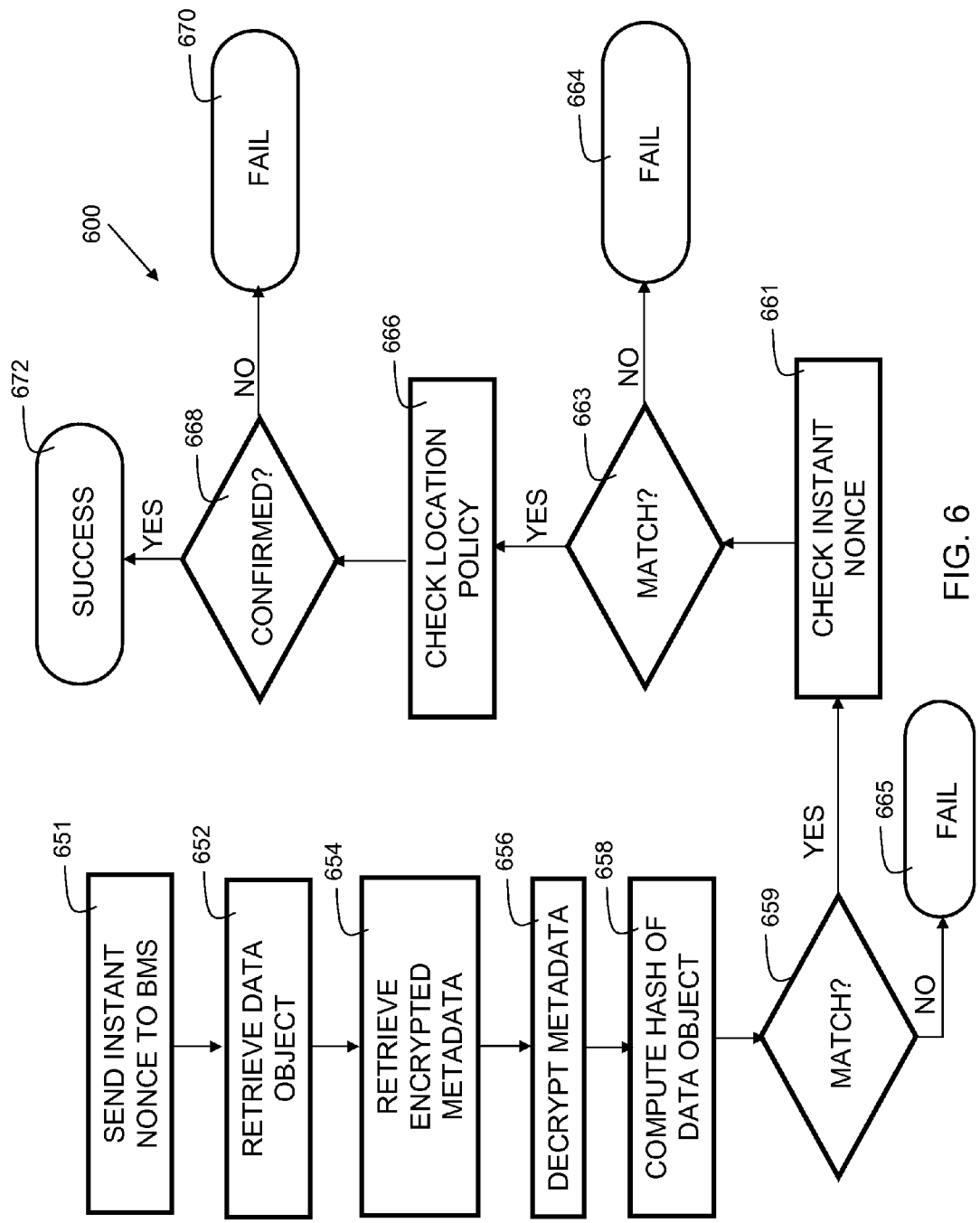
FIG. 6 is a flowchart indicating process steps for a post-authentication process in accordance with alternative embodiments of the present invention.

FIG. 6 is a flowchart 600 indicating process steps for a post-authentication process in accordance with alternative embodiments of the present invention. In process step 651 an instant nonce is sent from the container node (or other attestation server) to the BMS device that is storing the data object that is to be retrieved. The instant nonce is a random number that is generated just prior to the read operation. For example, the instant nonce may be generated within two seconds of issuing the read operation to retrieve object data in process step 652. In embodiments, the instant nonce may be a number or alphanumeric string ranging from 32 bits to 1024 bits. In process step 654, the container node retrieves encrypted metadata associated with the data object. This may be performed by a container node reading encrypted metadata from a BMS device. In some embodiments, process step 652 and process step 654 may be performed simultaneously. For example, the metadata may be appended or prepended to the data object such as is illustrated in FIG. 4. The encrypted metadata also includes an encrypted version of the instant nonce (see 405 of FIG. 4) sent in process step 651. The encrypted version of the instant nonce is used to thwart a man-in-the-middle attack, since it requires an encryption and decryption of a new piece of data. Thus, even if the object and geotag information have been previously discovered by an attacker, the instant nonce creates a mechanism for detecting such an intrusion.

In process step 656, the container node decrypts the metadata. In embodiments, the decryption uses a public key that corresponds to a private key within the security chip of the BMS device that the data object is being retrieved from. The decrypted metadata includes a stored hash of the data object, a geotag, and may optionally include a location policy for that object, similar to that shown in FIG. 3. In process step 658, a hash of the data object is computed. This computation may be performed on the container node device. In embodiments, the hash may be an MD5 hash, or SHA (secure hash algorithm) hash such as SHA-1 or SHA-2. Other hash algorithms or check sums (e.g., CRC-32) may also be used. In process step 659, the hash computed by the container node is compared to the decrypted stored hash that came from the BMS device. If the computed hash and stored hash do not match, the process terminates in a failure state 665. If the computed hash and stored hash match, then the data object is confirmed to have been retrieved from the BMS device that was indicated by the geotag that was part of the metadata retrieved in process step 654, and the process proceeds to process step 661 of the container node checking the instant nonce. This includes comparing the nonce value sent by the container node (or other attestation node) to the value retrieved from the metadata. If those values match in step 663, then the process proceeds to the location policy check at process step 666. If the sent and received instant nonces do not match, then the process ends at step 664 in a failure state. This failure state could be indicative of a potential man-in-the-middle attack, and an error message may be sent to appropriate IT administrators as a result of this failure state. Thus, a man-in-the-middle error is signaled in response to the generated instant nonce being unequal to the decrypted instant nonce.

In process step 666, the container node checks a location policy. In some embodiments, the location policy may include a list of eligible geotags. If the geotag decrypted in the metadata of step 656 is one of the geotags allowed by the location policy, then the location policy is confirmed by the container node in process 668, resulting in successful completion at step 672. If the geotag from the metadata does not match one of the strings in the location policy, then the process enters a failure state at step 670. An error indication may be propagated to users and administrators of the cloud storage system. The error indication may include identification of the BMS device and container node involved in the failed transaction. Thus, a geolocation error is signaled if the location policy is violated. This allows the location policy violation to be identified and corrected.

In some embodiments, the location policy may utilize a latitude-longitude pair instead of an alphanumeric string. In such an embodiment, the location policy may include one or more latitude and longitude coordinate pairs, a distance such as a diameter from a point, or other suitable technique for defining a boundary. Thus, in embodiments, checking the geotag comprises checking a latitude-longitude value against a predefined geographic region. If the latitude-longitude returned in the geotag is within the defined boundary, then the location policy is deemed to be satisfied. For example, if a particular data object is not to be stored in Canada, then a geotag with a latitude value of 41 degrees or less indicates that the location policy is confirmed. Thus, some embodiments may utilize an equation to define the location policy. For example, a location policy of:

a. LAT >33 AND LAT <41 can be used along with longitudinal criteria to confirm a location within the United States.

Figure 7:
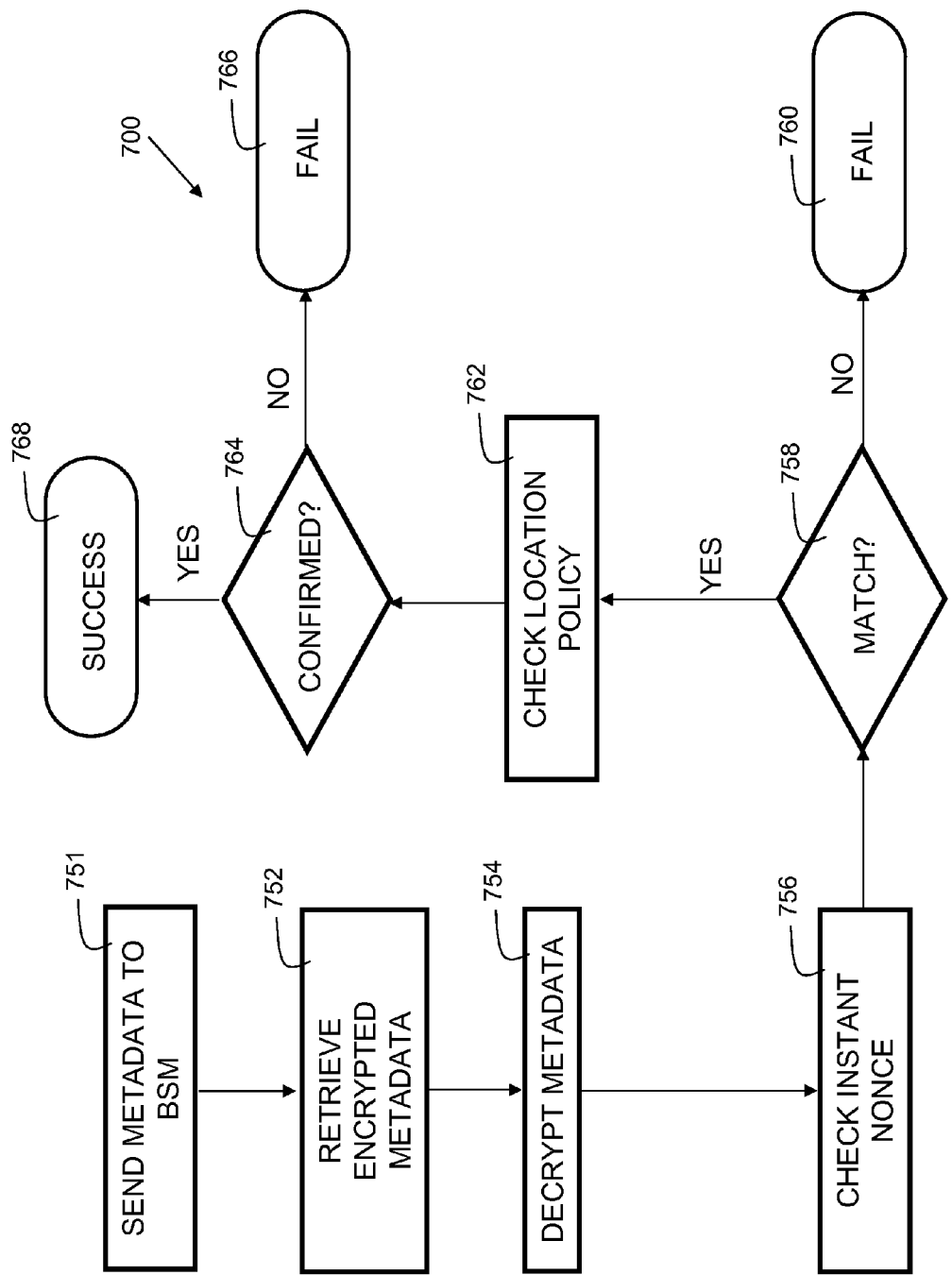
FIG. 7 is a flowchart indicating process steps for a pre-authentication process in accordance with embodiments of the present invention.

FIG. 7 is a flowchart 700 indicating process steps for a pre-authentication process in accordance with embodiments of the present invention. In these embodiments, the geographic location of a BMS device is authenticated before any data is written. This scheme provides improved security, with a tradeoff of additional time required for the pre-authenticate process before a write of a data object to a BMS device. In process step 751, metadata including an instant nonce and a location policy is sent from the container node (or other attestation server) to the BMS device that is storing the data object that is to be retrieved. The instant nonce is a random number that is generated just prior to a write operation. In process step 752, encrypted metadata is retrieved by the container node in the form of a pre-write encrypted metadata block.

Figure 8:
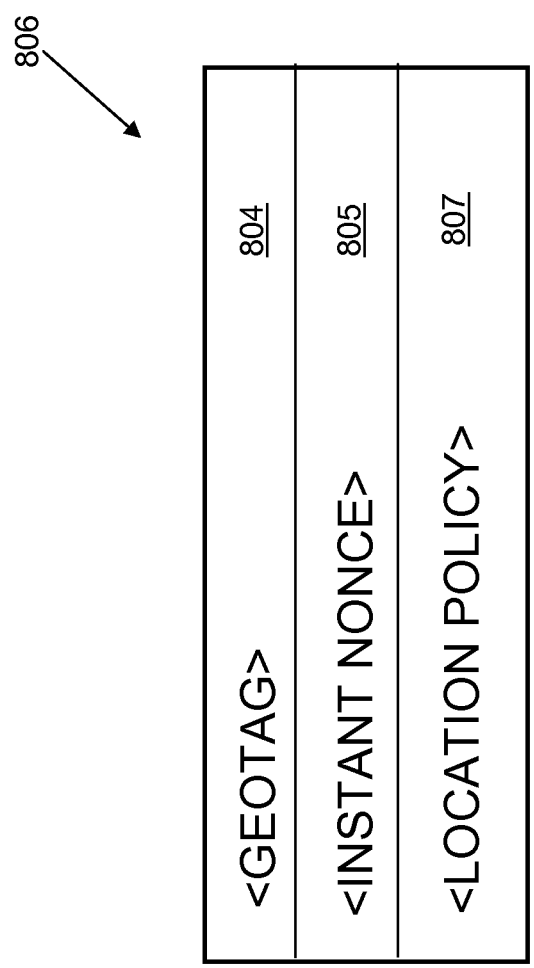
FIG. 8 is an example of a pre-write encrypted metadata block in accordance with embodiments of the present invention.

FIG. 8 shows an exemplary pre-write encrypted metadata block 806. Pre-write encrypted metadata block 806 includes a geotag 804, a location policy 807, and an instant nonce 805. Referring again to FIG. 7, in conjunction with FIG. 8, in process step 754, the metadata block 806 is decrypted. In process step 756, the instant nonce is checked. This includes comparing the nonce value sent by the container node (or other attestation node) to the value retrieved from the metadata. If those values match in step 758, then the process proceeds to the location policy check at process step 762. If the sent and received instant nonces do not match, then the process ends at step 760 in a failure state. This failure state could be indicative of a potential man-in-the-middle attack, and an error message may be sent to appropriate IT administrators as a result of this failure state. If the geotag decrypted in the metadata of step 754 is one of the geotags allowed by the location policy, then the location policy is confirmed by the container node in process 764, resulting in successful completion at step 768. At this point, the write of the data object to the BMS device may proceed. Thus, before a data object is stored on a BMS device, the process steps indicated in flowchart 700 are executed. If the geotag from the metadata does not match one of the strings in the location policy, then the process enters a failure state at step 766. An error indication may be propagated to users and administrators of the cloud storage system. The error indication may include identification of the BMS device and container node involved in the failed transaction. This allows the geolocation policy violation to be identified and corrected.

Figure 9:
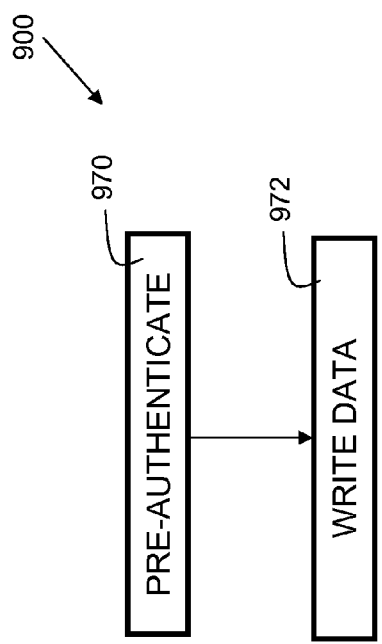
FIG. 9 is a flowchart indicating a data write process in accordance with embodiments of the present invention.

FIG. 9 is a flowchart 900 indicating a data write process in accordance with embodiments of the present invention. The container node (110 of FIG. 1) may execute an algorithm to select an appropriate BMS device based on location, load balancing, available storage capacity, and/or other factors. In embodiments, the container node and other cloud storage elements may implement Swift Object Store, Ceph, or IBM GPFS (General Parallel File System). Other data object storage systems are possible and included within the scope of the invention. Before writing data to the selected BMS device, a pre-authenticate process 970 is performed. Details of this process are outlined in flowchart 700 of FIG. 7. The pre-authenticate process provides assurance that the BMS device to be used is within the required jurisdiction. If the pre-authenticate process succeeds (step 768 of FIG. 7), then the container node writes the data to the BMS device in process step 972.

Figure 10:
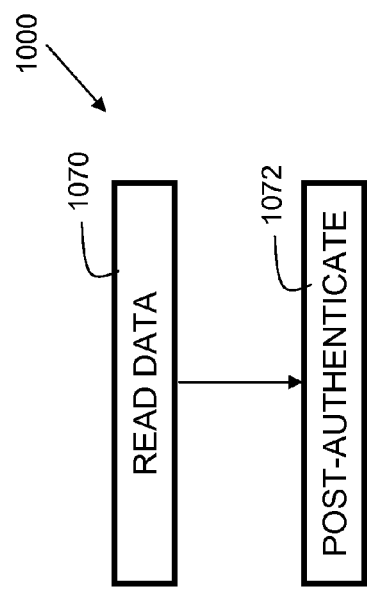
FIG. 10 is a flowchart indicating a data read process in accordance with embodiments of the present invention.

FIG. 10 is a flowchart 1000 indicating a data read process in accordance with embodiments of the present invention. In process step 1070, a data object and associated metadata is retrieved from a BMS device. Following the read, a post-authenticate process 1072 is performed. Details of this process are outlined in flowchart 600 of FIG. 6. Thus, in these embodiments, after each read, the geographic location of the BMS device that stored the data is confirmed. This embodiment has improved performance over the embodiment shown in FIG. 8, since the write operation is not slowed down by a pre-authenticate process. The tradeoff is that the geographic location is not confirmed until after the data object has been written to the BMS, which is a less secure mode of operation.

In some embodiments, both a pre-authenticate and post authenticate process may be used. Thus, before each write, a pre-authenticate process is used (as shown in FIG. 9), and, after each read, a post-authenticate process is used (as shown in FIG. 10). Thus, these embodiments provide increased geographic assurance by confirming the storage geolocation (i.e., physical geographic location of the BMS) before each write and after each read.

The cloud storage system 100 indicated in FIG. 1 may be described in the general context of computer-executable instructions, such as program modules, being executed by a computer. Generally, program modules include routines, programs, components, logic, data structures, and so on, which perform particular tasks or implement particular abstract data types. Exemplary system 100 may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, geolocation authentication may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

Embodiments of the present invention may also include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Disclosed embodiments provide an approach for controlling and authenticating the storage location of data objects in a geographically distributed cloud storage system. While embodiments of the invention have been particularly shown and described in conjunction with a preferred embodiment thereof, it will be appreciated that variations and modifications will occur to those skilled in the art. Therefore, it is to be understood that the appended claims are intended to cover all such modifications and changes that fall within the scope of embodiments of the present invention.

What is claimed is:

1. A computer-implemented method for confirming a physical storage location of data comprising:
    writing a data object to a bare metal storage node, wherein the bare metal storage node comprises a processor, memory coupled to the processor, and the security chip, wherein the security chip is coupled to the processor;
    computing a hash of the data object using the processor;
    sending the hash to the security chip;
    encrypting the hash and a geotag using the security chip to form an encrypted metadata block;
    reading the data object and encrypted metadata block from the bare metal storage node;
    decrypting the encrypted metadata block to decrypt the hash and the geotag;
    computing a new hash for the data object;
    comparing the new hash to the decrypted hash and signaling a first error if the new hash is unequal to the decrypted hash;
    checking the geotag against a location policy and signaling a second error if the location policy is violated;

performing a pre-authentication prior to the writing of the data object to the bare metal storage node, wherein the pre-authentication comprises:
generating an instant nonce;
sending the instant nonce to the security chip;
encrypting the instant nonce and the geotag using the security chip to form a pre-write encrypted metadata block;
decrypting the pre-write encrypted metadata block to derive a decrypted instant nonce; and
comparing the generated instant nonce to the decrypted instant nonce and signaling a man-in-the-middle error if the generated instant nonce is unequal to the decrypted instant nonce.

2. The method of claim 1, wherein computing a new hash for the data object comprises computing an md5 hash.

3. The method of claim 1, wherein computing a new hash for the data object comprises computing a secure hash algorithm (SHA) hash.

4. The method of claim 1, wherein checking the geotag comprises checking a latitude-longitude value against a predefined geographic region.

5. The method of claim 1, wherein checking the geotag comprises checking an alphanumeric identifier against a list of approved alphanumeric identifiers.

6. The method of claim 1, wherein decrypting the encrypted metadata block is performed using a public key.

7. A computer-implemented method for confirming a physical storage location of data comprising:
writing a data object to a bare metal storage node, wherein the bare metal storage node comprises a processor, memory coupled to the processor, and the security chip, wherein the security chip is coupled to the processor;
computing a hash of the data object using the processor;
sending the hash to the security chip;
encrypting the hash and a geotag using the security chip to form an encrypted metadata block;
reading the data object and encrypted metadata block from the bare metal storage node;
decrypting the encrypted metadata block to decrypt the hash and the geotag;
computing a new hash for the data object;
comparing the new hash to the decrypted hash and signaling a first error if the new hash is unequal to the decrypted hash;
checking the geotag against a location policy and signaling a second error if the location policy is violated;
performing a pre-authentication prior to the writing of the data object to the bare metal storage node, wherein the pre-authentication comprises:
generating an instant nonce;
sending the instant nonce to the security chip;
encrypting the instant nonce and the geotag using the security chip to form a pre-write encrypted metadata block;
decrypting the pre-write encrypted metadata block to derive a decrypted instant nonce; and
comparing the generated instant nonce to the decrypted instant nonce and signaling a man-in-the-middle error if the generated instant nonce is unequal to the decrypted instant nonce.

8. The method of claim 7, wherein computing a new hash for the data object comprises computing an md5 hash.

9. The method of claim 7, wherein computing a new hash for the data object comprises computing a secure hash algorithm (SHA) hash.

10. The method of claim 7, wherein checking the geotag comprises checking a latitude-longitude value against a predefined geographic region.

11. The method of claim 7, wherein checking the geotag comprises checking an alphanumeric identifier against a list of approved alphanumeric identifiers.

12. The method of claim 7, wherein decrypting the pre-write encrypted metadata is performed using a public key.

13. The method of claim 12, wherein encrypting the hash and the geotag using the security chip is performed using a private key.

14. A cloud storage system comprising:
a container node computer comprising a processor and memory;
a bare metal storage node (BMS) device, wherein the BMS device comprises:
a processor;
at least one storage device;
a memory coupled to the processor;
a security chip;
a bus coupling the security chip to the processor;
wherein the container node memory contains instructions, that when executed by the processor of the container node computer, perform the steps of:
performing a pre-authenticate process, the pre-authenticate process comprising:
generating an instant nonce,
sending the instant nonce to the security chip,
encrypting the instant nonce and a geotag using the security chip to form a pre-write encrypted metadata block,
decrypting the pre-write encrypted metadata block to derive a decrypted instant nonce, and
comparing the generated instant nonce to the decrypted instant nonce and signaling a man-in-the-middle error if the generated instant nonce is unequal to the decrypted instant nonce;
retrieving a data object from the BMS device;
retrieving encrypted metadata for the data object, wherein the encrypted metadata comprises:
a stored hash for the data object; and
the geotag;
decrypting the encrypted metadata;
computing a new hash for the data object;
comparing the new hash to the stored hash and signaling a first error if the stored hash is unequal to the new hash; and
checking the geotag against a location policy and signaling a second error if the location policy is violated.

15. The system of claim 14, wherein the security chip further comprises a geolocation module.

16. The system of claim 14, wherein the at least one storage device includes a RAID system.

17. The system of claim 14, wherein the instructions for computing a new hash for the data object comprises instructions for computing an md5 hash.

18. The system of claim 14, wherein the instructions for computing a new hash for the data object comprises instructions for computing a secure hash algorithm (SHA) hash.

* * * * *